United States Patent [19]

Davidson

[11] Patent Number: 4,892,054

[45] Date of Patent: Jan. 9, 1990

[54] COMPOSITE TRANSOM STRUCTURE

[75] Inventor: Samuel L. Davidson, Monroe, La.

[73] Assignee: Mastercrafters Corporation, Winnsboro, La.

[21] Appl. No.: 266,858

[22] Filed: Nov. 3, 1988

Related U.S. Application Data

[63] Continuation-in-part of Ser. No. 939,687, Dec. 9, 1986, abandoned.

[51] Int. Cl.⁴ ............................................. B63B 5/24
[52] U.S. Cl. ................................... 114/357; 114/355
[58] Field of Search ............... 114/355, 356, 357, 360; 441/74; 428/117, 325, 910; 244/133, 123; 264/7, 46, 251, 258; 156/291, 292

[56] References Cited

U.S. PATENT DOCUMENTS

| | | | |
|---|---|---|---|
| 3,080,267 | 3/1963 | Schmalz | 264/46.7 X |
| 3,124,626 | 3/1964 | Graham et al. | 264/46.7 X |
| 3,176,055 | 3/1965 | Loos | 264/46.7 X |
| 3,282,761 | 11/1966 | Evangelist | 114/357 |
| 3,444,568 | 5/1969 | Vogelsane | 114/357 |
| 3,634,898 | 1/1972 | Geiger | 114/357 |
| 3,707,434 | 12/1972 | Stayner | 428/325 X |
| 3,970,324 | 7/1976 | Howat | 428/117 X |
| 4,065,820 | 1/1978 | Starratt, Jr. | 114/357 |
| 4,161,796 | 7/1979 | Kostanecki | 114/357 |
| 4,483,267 | 11/1984 | Seemann | 114/357 |

FOREIGN PATENT DOCUMENTS 696148  10/1964  Canada .................... 114/357

Primary Examiner—Joseph F. Peters, Jr.
Assistant Examiner—Clifford T. Bartz
Attorney, Agent, or Firm—Fleit, Jacobson, Cohn, Price, Holman & Stern

[57] ABSTRACT

A transom for a boat is made of a metal grid structure filled with a hardened slurry of glass microspheres mixed with a polyester resin, the grid being covered on opposite sides by layers of fiberglass. The transom avoids the problem of rotting which is prevalent in wooden transoms when they are drilled with bolt holes for receiving outboard motors or other similar equipment.

20 Claims, 3 Drawing Sheets

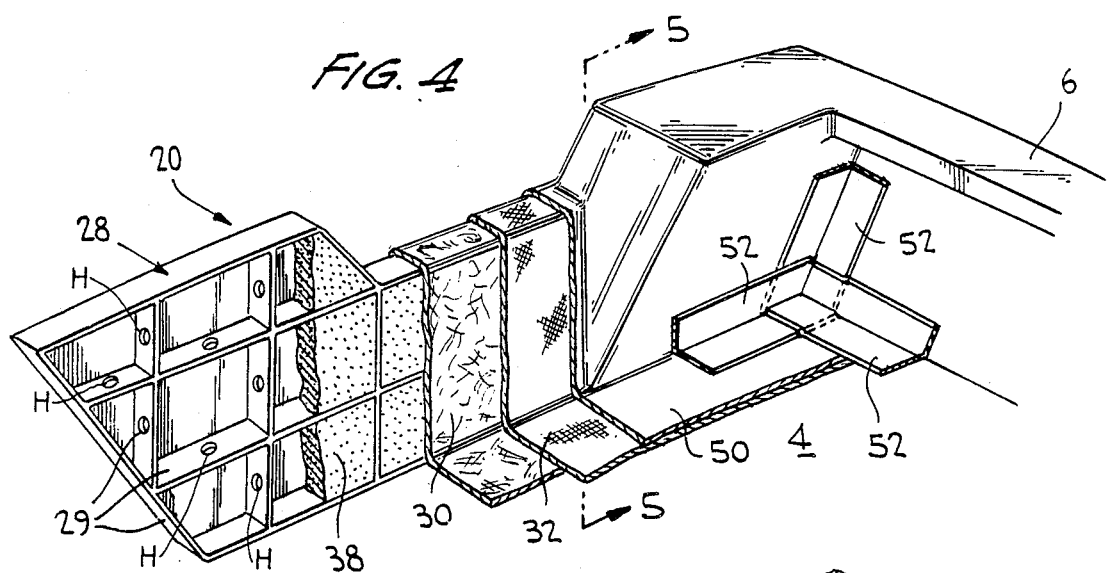
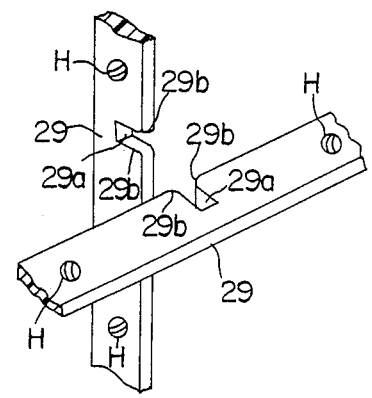
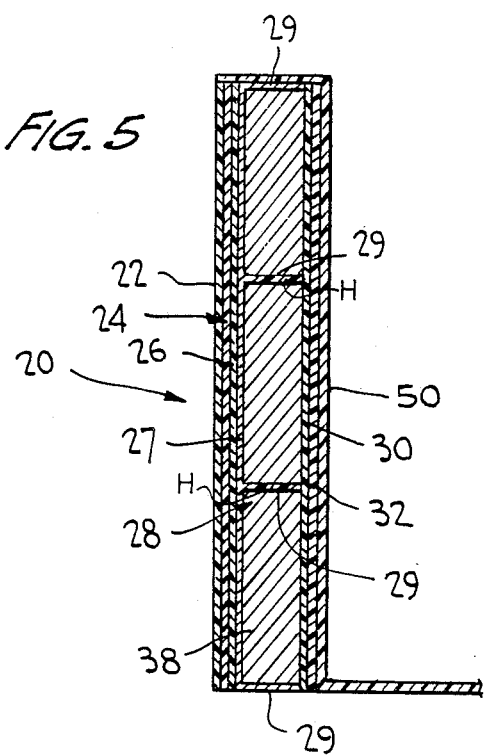

COMPOSITE TRANSOM STRUCTURE

CROSS REFERENCE TO RELATED APPLICATION

This application is a Continuation in Part of application Ser. No. 939,687 filed Dec. 9, 1986 now abandoned and the contents of which is expressly incorporated herein by reference.

BACKGROUND OF THE INVENTION

This invention relates to boats, and in particular, to that part of a boat commonly known as a transom.

For practical purposes, the transom of a boat is the back of a boat, or a part of the back, more particularly that part of the boat to which the motor is attached in the case of an outboard motor, to which the so-called "stern drive" attaches in the case of a inboard/outboard arrangement or which, in other cases, merely serves as the rear wall of the boat. The invention has particular utility in relation to outboard motors and stern drive-boats an the term "transom" as used herein is to be understood as the rear portion of a boat to which the motor is attached.

As well known to those skilled in the art, when an outboard motor or stern drive is used to power a boat, it is attached to the transom by means of bolts. In essence, the outboard motor consists of a power head, a lower drive unit, means connecting the power head to the lower drive unit, and a bracket mechanism for mounting the whole assembly in relation to the boat. In this regard, the bracket is normally bolted to the transom so as to place the lower unit of the motor in proper position to thereby propel the boat with the propeller mounted on the lower unit. Similarly, with a stern drive, the lower unit extends from a housing attached to the transom.

Considering the above it will be apparent that it is common practice to drill the transom in order to permit the bolts to pass therethrough. Other items may commonly be mounted on the transom as well, but motor bolts are the most common cause for the so-called "drilling" of the transom.

In addition to exposing the transom's structure by virtue of the motor bolt holes drilled therethrough, it is noted that most boats are made in two parts, namely a bottom part and a top part. The bottom part of the boat, normally known as the hull, has the transom mounted at the rear end while the top part of the boat, normally called the deck, is attached to the hull. A seam is formed between the deck and the hull in the area of the transom and commonly this seam is formed in such a manner that it may have a tendency to leak.

In view of the potential for leaking at the joint between the deck and the hull in the area of the transom, and also the potential for leakage when holes are drilled through the transom for the motor bolts and the same are not thereafter properly sealed, it is quite common, as most outboard owners eventually realize, for transoms to rot. There is no way to determine the average life of a transom or its susceptibility to rot, because so much is dependent on the way the outboard motor is mounted, on what other holes may be made in the transom, on the way the transom is put together, and on the degree of sealing in the transom area between the deck and the hull. Suffice it to say, however, that rot in transoms is quite common in boats with power systems which require transom bolting.

In a traditional inexpensive boat, plywood pieces are bonded together to form a transom.

Regardless of the prior art transom structure used, the resulting product is usually adequate for a year or two. If the transom structure is properly sealed with silicone or other sealer so that water does not get to it when the motor holes are drilled or other items are installed on the transom, the same may last somewhat longer.

With the advent of the larger motors, the wood structure alone may be inadequate and the better boats have incorporated knee braces bonded between transom and stringers as well as metal reinforcing plates of one sort or another. To this end, any boat with reasonably high horsepower such as 140 or 150 HP engine or above should have both a plate on the outside of the boat and a plate on the inside of the splash well or inside of the transom to distribute the stresses from the motor throughout the entire transom area. Preferably at least one of these plates is folded as a right angle piece so as to minimize any tendency of the transom to bow.

While the use of metal reinforcements, and in fact the use of full inch and a quarter marine plywood tends to minimize any transom problems, those who have had a boat previously recognize that the metal plates and the wood transom are not ultimately the answer to any problem.

The problem is magnified as the horsepower attached to the boat increases and as the severity of conditions to which the boat is subjected increases. The larger the motor, the more strain on the transom, the more tendency there is for a slight flex. The more tendency there is for a slight flex, the more common the deterioration of the seals, and as the seals deteriorate, rot becomes a problem. The flex in the transom, particularly where wood is used, is not necessarily bad. Should anyone have a boat with some flex in it, it is improper to automatically assume that there is a defective transom. On the other hand, the potential for problems still exists more with larger horsepower motors because of the increased flex.

As well known to those skilled in the art, the structure of the hull of a fiberglass boat is composed of a series of fiberglass layers. The bottom of the hull is reinforced, in the normal instance, with a stringer system, balsa core, or other structure to accommodate the stresses put on it in use, and the transom of the boat carries a structure which is suited to support the motor. In essence, therefore, there is what might be deemed the basic structure of the boat, there is additional bottom support structure, and there is a different additional transom support structure. From the foregoing, it is therefore apparent that this invention applies to a boat having a hull in which there is a basic exterior structure, a reinforcing structure for the bottom of the boat, and a support structure in the transom of the boat for supporting the motor, and particular improvement concerns the structure in the transom of the boat for supporting the motor.

SUMMARY OF THE INVENTION

A primary object of the present invention is to provide a transom which has adequate, if not improved, strength over existing transoms, but which is not subject to rot. As indicated, existing transom structures are almost always made of wood. A transom may, for example, be a single piece of one and one-quarter (1¼) inch plywood covered with fiberglass material on both sides, it may be a series of pieces of plywood "glassed" together, and also glassed in place, or may be some other form of wood. In essence, the wood needs to be a non-sap bearing wood and therefore it is common to find fir in the transom.

The present invention replaces the concept of using wood to form a transom and provides instead a transom comprising a composite of fiberglass material and a metal grid so formed and arranged to give the proper rigidity to the transom and yet so formed and arranged as to accommodate motor bolts and still so formed and arranged as to substantially eliminate the potential for rot. The transom in accordance with the invention may be used in combination with a standard form of fiberglass or aluminum hull. Such hull structures commonly include, in the case of a fiberglass boat, a composite fiberglass construction with foam flotation and glassed-in stringers or grillages to reinforce the boat bottom, these being either pre-formed or formed in place, or in the case of an aluminum boat, sheet material welded or riveted to form the hull and ribs and knee and seat braces used for reinforcement.

Obviously, increased strength in transoms can be obtained in manners other than those described and claimed herein. However, other constructions which may be considered have the severe disadvantage of increasing the weight of the transom so substantially as to be commercially unacceptable. The small increases in weight concomitant with the instant inventive concepts, on the order of no more than 25 to 30 percent of a standard transom or less than 5 percent of the total weight on a better made boat, are acceptable in order to provide the increased life and strength realized by this invention.

Additional features and advantages of the invention will become apparent from the ensuing description and claims read in conjunction with the accompanying drawings.

BRIEF DESCRIPTION OF THE DRAWINGS

FIG. 3b is an exploded view of parts of the grid;

FIG. 4 is a perspective view, partially broken away, of the boat shown in FIG. 1;

FIG. 5 is a sectional view taken on line 5—5 of FIG. 4; and

DESCRIPTION OF THE PREFERRED EMBODIMENT

Figure 1:
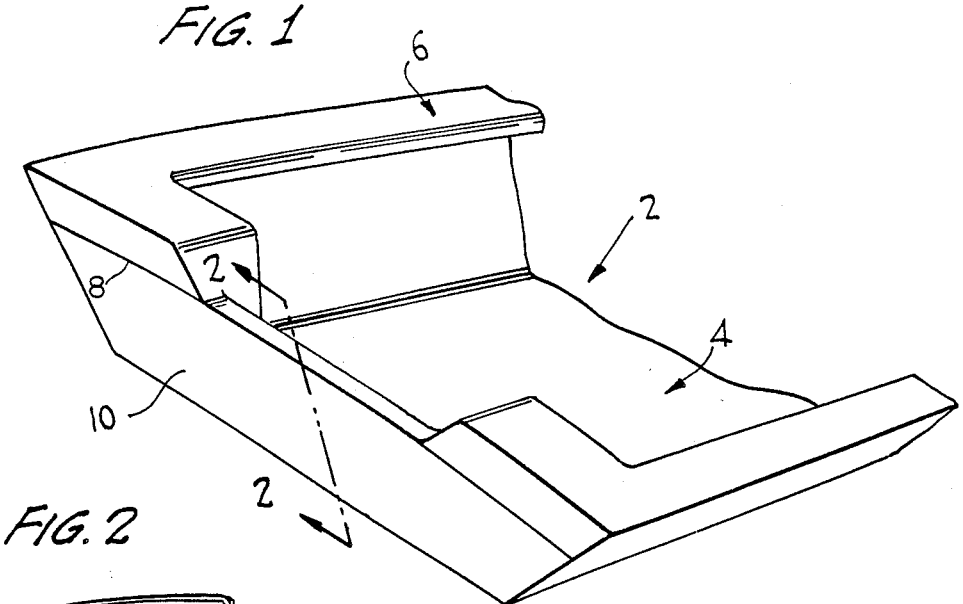
FIG. 1 is a perspective view, partially broken away, of the rear section of a boat.

The rear section of boat 2 shown in FIG. 1 comprises a hull section 4 and a deck section 6. The hull section 4 is joined to the deck section 6 along a seam 8. The rear wall of the boat 10 defines an outside surface of the transom of the boat. It is the structure behind this outside wall which is the subject of the invention.

The transom 20 illustrated in the drawings comprises the entire rear wall. However, it is to be understood that the transom according to the instant invention need only extend from at least point A to at least point B shown in FIG. 6 so that no water can get in and generally extends only to the height of the hull 4 (in contrast to the height of the deck 6 as shown in the drawings). Moreover, the transom 20 could extend down only to the level of the floor 12 or below in some constructions. The transom generally follows the contour of the top and bottom hull structure to which it is attached extending downwardly to the lowest level of the boat which carries the motor.

The significant relationship is that the transom construction of this invention must extend over the area which will carry the motor which with prior art or standard wood transoms would be subject to rot, particularly in the areas of the deck to hull seam and the motor bolt holes. If the transom does not extend the full width of the rear of the boat, standard wooden knee braces can be used on either side to ensure a secure support for the transom. The side portions in such constructions can be filled with wood or other material and would not normally be drilled and would, therefore, not be subject to deterioration. A transom constructed according to the instant invention generally extends over at least one-half, and in most instances, at least two-thirds of the width of the rear wall but in less expensive boats need not go over the entire width.

The key to the instant invention is the provision of a wood-free transom in the area to which the motor is attached. Instead, the basic transom is provided by a composite structure of fiberglass and an aluminum grid. The opposite sides of the transom are formed by multiple layers of fiberglass as shown in the drawing, with the core of the transom being formed by an aluminum grid filled with a plastic resin/micro-sphere composition. With this arrangement there is nothing to deteriorate and the actual flex in the transom is minimized. Additionally, should any bolt hole, or other through hull fitting leak, all that gets wet is the plastic which is not sensitive to water and not sensitive to water decay. Thus, it is to be understood that the shape of the transom shown in the drawings is illustrative and other shapes and sizes may be used without departing from the instant inventive concepts. However, for ease in understanding, the remaining detailed description will be directed to the illustrated embodiment.

Figure 2:
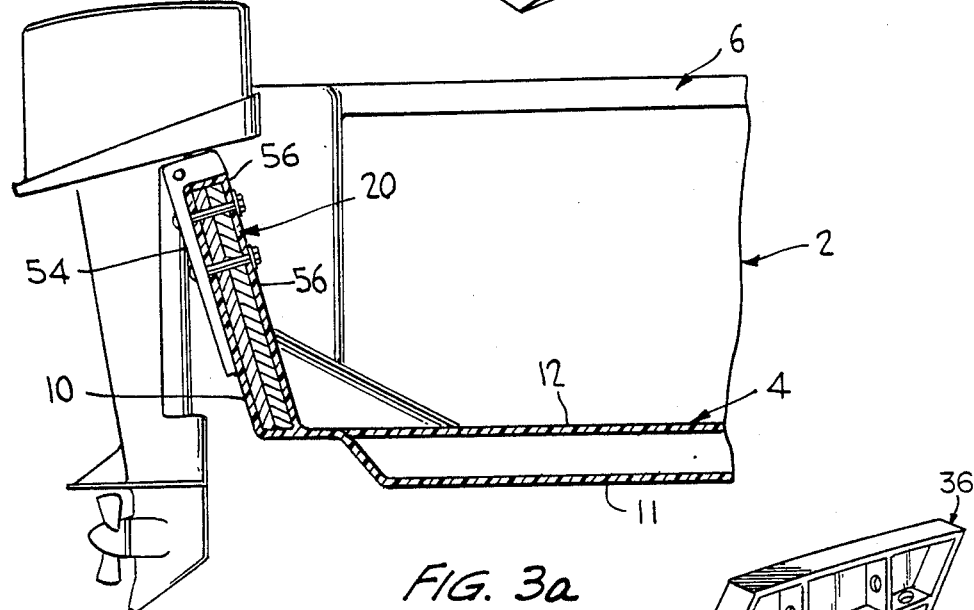
FIG. 2 is a transverse sectional view of the rear of the boat shown in FIG. 1, FIG. 2 being taken on line 2—2 of FIG. 1.
Figure 6:
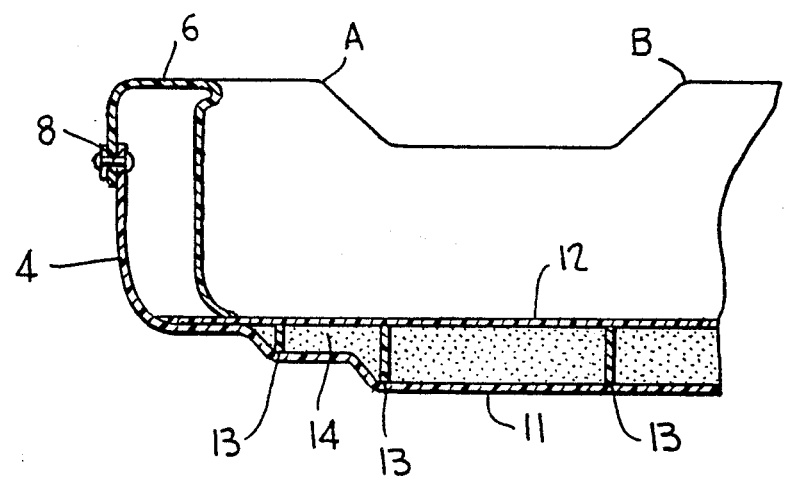
FIG. 6 is a sectional view taken along line 6—6 of FIG. 1.

As shown in FIG. 2 the hull section 4 has a series of surfaces at different levels, the lowermost section 11 being what is commonly called the pad the upper section 12 being the floor between which are the conventional stringers 13 and foam flotation 14 (see FIG. 6). The hull section, and indeed the remainder of the boat apart from the transom 20 may be of a conventional fiberglass-type structure comprising multiple fiberglass layers, or it may be of a conventional aluminum-type structure. Adjacent to the rear wall 10 is the transom 20.

This transom as shown in FIG. 5 consists of an outer layer of paint or gel coat 22, a next layer of random fiberglass 24, a next inner layer of unidirectional triaxial fiberglass 26, a further layer of random fiberglass 27, a metal grid 28, another random fiberglass layer 30, and an inner layer of unidirectional triaxial fiberglass 32.

Figure 3A:
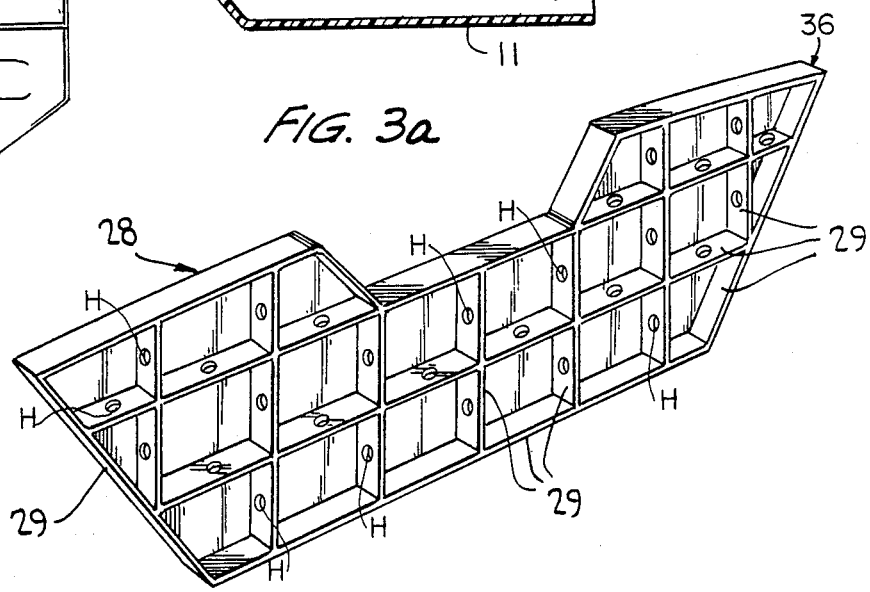
FIG. 3a is a perspective view of one embodiment of a grid used in a transom formed in accordance with the invention.

The grid 28 is shown in FIGS. 3a and 3b and generally consists of a series of parallel metal strips 29 bonded together at right angles and welded together in corners such as corner 36. The grid 28 is filled with a putty material 38 which is bondingly compatible with the fiberglass layers.

To facilitate assembly of the grid, the strips 29 may be slotted together as shown in FIG. 3b and the respective slots 29a may have rounded corners 29b which assist in locating the strips. Also, the strips may have holes H to allow the putty material to spread and evenly distribute itself throughout the grid. This also allows a direct bond between material in adjacent cells of the grid. The holes can vary in size up to a maximum of about one half the width of each strip 29. While the holes H are helpful in distributing the putty, they are not necessary in many applications.

Each of the fiberglass layers consists of glass fibers and polyester resin. The polyester resin so used is commonly known as a general purpose polyester resin.

While various different types of polyester resin may be used, and while epoxy resin may be used as well, it has been found desirable to use polyester resins which have a viscosity of the order of 400 to 600 centipoises, a gel time of between 23 and 24 minutes when catylized with M.E.K. peroxide catalyst, a peak exotherm temperature in the range between 250° and 400° F. and a shrink factor so-controlled as to generally equalize the time between catalyzation and gel, with the time between gel and peak exotherm.

Polyester resins which meet such specifications are common in the industry, and are used for bonding fiberglass layers in place. However, resins within this range are important because they minimize shrinkage during cure. The random fiberglass layers used in the composite structure shown in the drawings can very well be 1½ ounce fiberglass mat suitably wet out with a catalyzed polyester resin so as to render a glass to resin ratio of between 18 and 38%. The unidirectional triaxial materials shown in the drawings are preferably used in the invention and similarly wet out with polyester resins so as to have a glass to resin ratio on the order to 20 to 40%.

The metal grid which forms part of the invention is preferably an aluminum grid aladined in its entirety, including those corners where it has been welded together. While ⅛ inch aluminum serves the purposes adequately, a thickness of aluminum strip between ⅛ and ¼ inch is desirable. Front to back, it is helpful to maintain the thickness of the grid more than 1 and not less than 2 inches. In the normal instance, a 1¼ inch grid front to back has proved satisfactory. Grid openings between 1 and 2 inches give desirable results.

Desirably, to form the putty 38, a combination of polyester resin such as otherwise used with the glass layers, and glass microspheres may be used. Glass microspheres having a micron size of 177 and 149 are, for example, mixed in a proportion of from 1 to 3 to 3 to 1 to form a slurry or paste. The slurry or paste fills the grid and in essence serves as a bond between the fiberglass layers on either side of the grid. A desirable mixture comprises two parts by volume of resin to one part by volume of microspheres. This particular mixture appears to give a good strength to weight ratio. Suitable microspheres, for example, are glass bubbles Nos. C15/250, B28/750, and B37/2000 produced by the 3M Company.

In making the transom structure, it has been found desirable initially to laminate the layer of triaxially oriented unidirectional fibers to the layer of random fibers thereabove, such as the layers 24, 26, to then place the grid on top of such layers, and to then fill the grid approximately ⅔ full with the microsphere putty. Of course, the random material is against a surface such as polyethylene, formica, or the like from which it can easily be removed, and the molding is done in the horizontal position. After allowing the initial mixture to cure, thereby allowing the putty to shrink, the remainder of the grid is filled with the microspheres, and then a layer of random fiber and a layer of triaxially unidirectional fiber are placed over it. While the degree of filling of the transom may vary it has been found most desirable to eliminate the total filling so as to minimize any formation of the transom with excessive shrinkage. Curing of the polyester resin apparently causes shrinkage of the putty filler.

Once the transom has been formed to the point where the grid is filled with the remaining putty, and the two top layers are placed thereover, it is then allowed to cure. The transom is then suitably shaped, if not already shaped, to fit within a given boat and the transom is placed in the boat. This is normally accomplished by using a random layer of fiberglass against the gel coat of the boat to mate with the random layer of the transom, and by then bonding various places on the transom to the adjacent hull structure. As shown, for example, in FIG. 4, fiberglass straps 50 may be used to hold the bottom of the transom to the underlying hull structure. Similarly, the use of fiberglass straps such as those designated 52 in the corner of the structure may be desirable. This, in essence, chemically bonds the fiberglass transom into the hull thereby ensuring good stability. Also, the transom may be secured to the hull by in situ spraying a layer of fiberglass-containing resin over adjacent areas as of the transom and hull and across a joint between the transom and hull.

Once the transom has been secured in place, the deck and the hull can then be joined together to provide the ultimate structure shown in FIG. 1. Thereafter, the transom can be drilled with holes for bolts 56 for a motor bracket 54 or other items to be mounted thereon without fear of rotting since the material used in forming the transom is not subject to deterioration.

While the transom of this invention is particularly applicable in those instances where it will be drilled for motor bolt holes or the like, it is to be understood that this transom construction provides increased life and durability in a boat having means to support the motor other than with bolts passing through the transom.

While an aluminum transom grid properly aladined has been suggested above as the preferred embodiment of the invention, other materials may be suitably used to achieve a similar result. However, in selecting the materials, one must consider economic feasibility as well as potential abuse from marine usage.

In any case, it has been found that the transom so made can be fabricated and then installed in a boat at a relatively economic price and that the results achieved with this transom are particularly good. For years, there has been a search for a transom which is not subject to rot, and which would prove durable. This invention appears to answer that need.

It might be noted that while triaxial unidirectional material is preferably used as well as random layers, different fiberglass layer structures may be used on either side of the putty filled grid. For example, as distinct from unidirectional triaxial material, woven roving can be used. Moreover, biaxial unidirectional material can also prove satisfactory. The use of random fiber may be replaced by the use of chopped layers, or even the elimination of these layers. The important feature is that a series of layers is formed and arranged as to provide the ultimate strength desired on opposite sides of the putty filled grid.

While only a preferred embodiment of my invention has been described herein in detail, the invention is not limited thereby and modifications can be made within the scope of the attached claims.

What is claimed is:

1. In a boat having a hull section and a wall portion on which a drive unit is to be attached, the improvement wherein the wall portion is in the form of a composite structure comprising:
   (a) a stiff grid structure having a series of laterally and longitudinally extending ribs defining a series of open sections therebetween;
   (b) a hardened filler material filling the open sections between the ribs;
   (c) said filler material being bondable to fiberglass layers; and
   (d) fiberglass layers on opposite sides of the grid bonded together by the filler material trapping the grid therebetween and further wherein the boat includes at least one layer of material extending at least partly over said wall portion, across a joint between the wall portion and the hull section, and at least partly over the hull section, said layer being chemically bonded to the wall portion and the hull section so as to secure the wall portion and hull section together.

2. The invention as defined in claim 1, wherein the grid is formed of metal ribs and the open sections are substantially rectangular.

3. The invention as defined in claim 2, wherein the ribs are aluminum.

4. The invention as defined in claim 1, wherein the filler material is formed of a hardened slurry of glass microspheres and a polyester resin.

5. The invention as defined in claim 4, wherein the slurry contains about two parts by volume of the resin to one part by volume of the microspheres.

6. The invention as defined in claim 4, wherein the microspheres have a micron size of between 140 and 180.

7. The invention as defined in claim 6, wherein the slurry contains a mixture of microspheres having a micron size of about 149 and further microspheres having a micron size of about 177.

8. The invention of claim 1, wherein the fiberglass layers include at least one of each of a random fiberglass layer and a unidirectional fiberglass layer.

9. The invention as defined in claim 8, wherein the fiberglass layers comprise inner random fiberglass layers contacting opposite sides of the grid, and outer unidirectional layers over the random layers.

10. The invention of claim 9, including a further random fiberglass layer over the unidirectional layer on one side of the grid constituting an outer surface of said wall portion.

11. The invention of claim 10, including a gel coat over the further random layer.

12. The invention as defined in claim 1, including at least two fiberglass layers on each side of the grid, and wherein said at least one layer of material includes fiberglass straps connected between the wall portion and an adjacent portion of the boat.

13. The invention as defined in claim 1, wherein the fiberglass layers are selected from a group consisting essentially of random fiberglass layers, unidirectional triaxial fiberglass layers, unidirectional biaxial fiberglass layers, woven fiberglass roving layers, and chopped fiberglass layers.

14. The invention as defined in claim 1 wherein said at least one layer of material includes fiberglass sheet means extending over said wall portion and onto the hull section at the bottom of the wall portion.

15. The invention as defined in claim 14 wherein a second layer is extended at the bottom of the wall portion onto the hull section under said sheet means.

16. The invention as defined in claim 14 wherein said at least one layer includes fiberglass strap means over a corner joint defined between the wall portion and the hull section.

17. The invention as defined in claim 1 wherein the hull section comprises a multiple layer fiberglass hull.

18. The invention as defined in claim 1 wherein the hull section comprises a aluminum hull.

19. The invention as defined in claim 1 including holes in the ribs through which the filler material extends to provide a bond between the filler material in adjacent ones of the open sections.

20. The invention as defined in claim 19 wherein the ribs of the grid are slotted together and the slots have rounded corners to facilitate assembly of the grid.

* * * * *